US012797956B2

(12) United States Patent
Shamir et al.

(10) Patent No.: US 12,797,956 B2
(45) Date of Patent: Nov. 17, 2026

(54) ROTARY CUTTING TOOL HAVING A CENTRAL COOLANT PASSAGE NON-CIRCULAR IN CROSS-SECTION

(71) Applicant: ISCAR, LTD., Tefen (IL)

(72) Inventors: Itzhak Shamir, Kiryat Bialik (IL); Assaf Ballas, Nahariya (IL); Lioz Sosko, Nahariya (IL)

(73) Assignee: Iscar, Ltd., Tefen (IL)

( * ) Notice: Subject to any disclaimer, the term of this patent is extended or adjusted under 35 U.S.C. 154(b) by 602 days.

(21) Appl. No.: 18/458,227

(22) Filed: Aug. 30, 2023

(65) Prior Publication Data

US 2024/0109132 A1 Apr. 4, 2024

Related U.S. Application Data

(60) Provisional application No. 63/377,566, filed on Sep. 29, 2022.

(51) Int. Cl.
*B23B 27/10* (2006.01)
*B23B 27/16* (2006.01)
*B23C 5/28* (2006.01)

(52) U.S. Cl.
CPC .............. *B23B 27/10* (2013.01); *B23B 27/16* (2013.01)

(58) Field of Classification Search
CPC ....... B23C 5/28; B23C 5/282; B23C 2250/12; B23B 27/10; B23B 27/16
See application file for complete search history.

(56) References Cited

U.S. PATENT DOCUMENTS 2,412,939 A * 12/1946 Aston ...................... B23B 51/04 408/59
2,541,849 A * 2/1951 Villeneuve .............. B23B 51/06 408/59
(Continued)

FOREIGN PATENT DOCUMENTS

CN 109570598 A * 4/2019 ............... B23C 5/28
DE 102 60 136 A1 7/2004
(Continued)

OTHER PUBLICATIONS

International Search Report dated Dec. 22, 2023, issued in PCT counterpart application No. PCT/IL2023/050930.
(Continued)

*Primary Examiner* — Nicole N Ramos
(74) *Attorney, Agent, or Firm* — Womble Bond Dickinson (US) LLP

(57) ABSTRACT

A rotary cutting tool rotatable about a tool axis in a direction of rotation having a front cutting portion and a rear coupling portion. The front cutting portion has a front outer peripheral surface with a plurality of N circumferentially spaced apart cut-outs, each cut-out having an operative cutting edge associated therewith. A central coolant passage extends along the tool axis from a rear end of the rear coupling portion to the front cutting portion. A first plane perpendicular to the tool axis intersects the central coolant passage and the N operative cutting edges. In a cross-section taken in the first plane, the central coolant passage has a non-circular shape with N radially outer coolant regions. At least one coolant duct extends transversely from each radially outer coolant region to intersect with and open out at a corresponding one of the N cut-outs at a coolant exit port.

25 Claims, 6 Drawing Sheets

(56) References Cited

U.S. PATENT DOCUMENTS

| | | | | | |
|---|---|---|---|---|---|
| 2,847,885 | A * | 8/1958 | Wagner | B23B 51/0486 408/229 |
| 3,606,560 | A * | 9/1971 | McClennan | B23B 51/0486 408/59 |
| 7,207,755 | B2 | 4/2007 | Berglöw | |
| 8,439,609 | B2 * | 5/2013 | Woodruff | B23P 15/34 407/11 |
| 9,302,332 | B2 * | 4/2016 | Scanlon | B23B 51/06 |
| 10,814,406 | B1 * | 10/2020 | Wang | B23B 51/06 |
| 11,110,524 | B2 * | 9/2021 | Fang | B33Y 80/00 |
| 2009/0148247 | A1 * | 6/2009 | Nomura | B23B 51/0486 408/59 |
| 2012/0163931 | A1 | 6/2012 | Friedrichs | |
| 2020/0406379 | A1 * | 12/2020 | Aso | B23C 5/109 |
| 2023/0063846 | A1 | 3/2023 | Aso | |
| 2024/0109132 | A1 * | 4/2024 | Shamir | B23B 27/10 |

FOREIGN PATENT DOCUMENTS

| | | | | | |
|---|---|---|---|---|---|
| DE | 202009013808 | U1 * | 2/2010 | B23C 5/10 |
| DE | 102009030587 | B3 * | 11/2010 | B23C 5/28 |
| DE | 10 2014 013 210 | A1 | 3/2016 | |
| DE | 102020102007 | A1 * | 7/2021 | B23B 27/1625 |
| JP | 01051218 | A * | 2/1989 | |
| JP | 2011206887 | A * | 10/2011 | B23C 5/28 |

OTHER PUBLICATIONS

Written Opinion dated Dec. 22, 2023, issued in PCT counterpart application No. PCT/IL2023/050930.

* cited by examiner

ROTARY CUTTING TOOL HAVING A CENTRAL COOLANT PASSAGE NON-CIRCULAR IN CROSS-SECTION

RELATED APPLICATIONS

Priority is claimed to U.S. Provisional Patent Application No. 63/377,566 filed Sep. 29, 2022, the contents of which are incorporated by reference in their entirety.

FIELD OF THE INVENTION

The present invention relates to a rotary cutting tool having a central coolant passage with a non-circular cross-sectional shape, for use in metal cutting processes in general, and for milling operations in particular.

BACKGROUND OF THE INVENTION

Within the field of rotary cutting tools used in milling operations, there are many examples in which the cutting tool has a central coolant passage, and some examples in which the central coolant passage has a non-circular cross-sectional shape.

U.S. Pat. No. 7,207,755 B2 discloses a cutting tool arrangement and a tool for chip removing machining, the cutting tool arrangement comprising a tool, fastening arrangement, and a shank. The tool is a one-piece unit having an axial channel. The axial channel is of non-circular cross-section to provide a key grip, and an end of the axial channel comprises material at least partly blocking the axial channel.

US2012/163931 A1 discloses a tool which comprises a shank with a central, continuous internal channel and an insert which protrudes into the internal channel and is frictionally and/or mechanically positively connected with the shank, wherein the internal channel has one or more widenings which in work operation of the tool serve as cooling channels.

JP7057550 B1 (US2023/0063846 A1) discloses a rotary cutting tool configured to supply coolant fluid toward its cutting edges. The cutting tool includes a holding part and a cutting part, and a flow passage for guiding cooling fluid to an outlet port in the cutting part. The flow passage includes a plurality of first flow passages which at least partially extend parallel to the tool's rotation center axis, and a plurality of second flow passages extending from the first flow passages towards the cutting edges.

It is an object of the present invention to provide an improved rotary cutting tool having a central coolant passage with a non-circular cross-sectional shape.

It is also an object of the present invention to provide an improved rotary cutting tool with coolant ducts extending transversely away from the central coolant passage such that flexibility of design is afforded with respect to the direction and extent of each coolant duct.

It is a further object of the present invention to provide an improved rotary cutting tool whereby uniform and axisymmetric flow of coolant fluid along each coolant duct is promoted.

SUMMARY OF THE INVENTION

In accordance with the present invention, there is provided a rotary cutting tool rotatable about a tool axis in a direction of rotation, the tool axis defining a forward-to-rearward direction, and comprising a tool body having a front cutting portion and a rear coupling portion, the front cutting portion having a front outer peripheral surface with a plurality of N circumferentially spaced apart cut-outs, where N is a specific integer number greater than one, each cut-out opening out at a front end of the front cutting portion and having an operative cutting edge associated therewith, wherein a central coolant passage extends along the tool axis from a rear end of the rear coupling portion to the front cutting portion, and a first plane perpendicular to the tool axis intersects the central coolant passage and the N operative cutting edges, wherein, in a cross-section taken in the first plane, the central coolant passage has a non-circular shape with N radially outer coolant regions, each radially outer coolant region having a first radially outermost coolant point, and the central coolant passage is circumscribed by an imaginary first circle having a first diameter and a center coincident with the tool axis, and wherein:

at least one coolant duct extends transversely from each radially outer coolant region to intersect with and open out at one of the N cut-outs at a coolant exit port.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
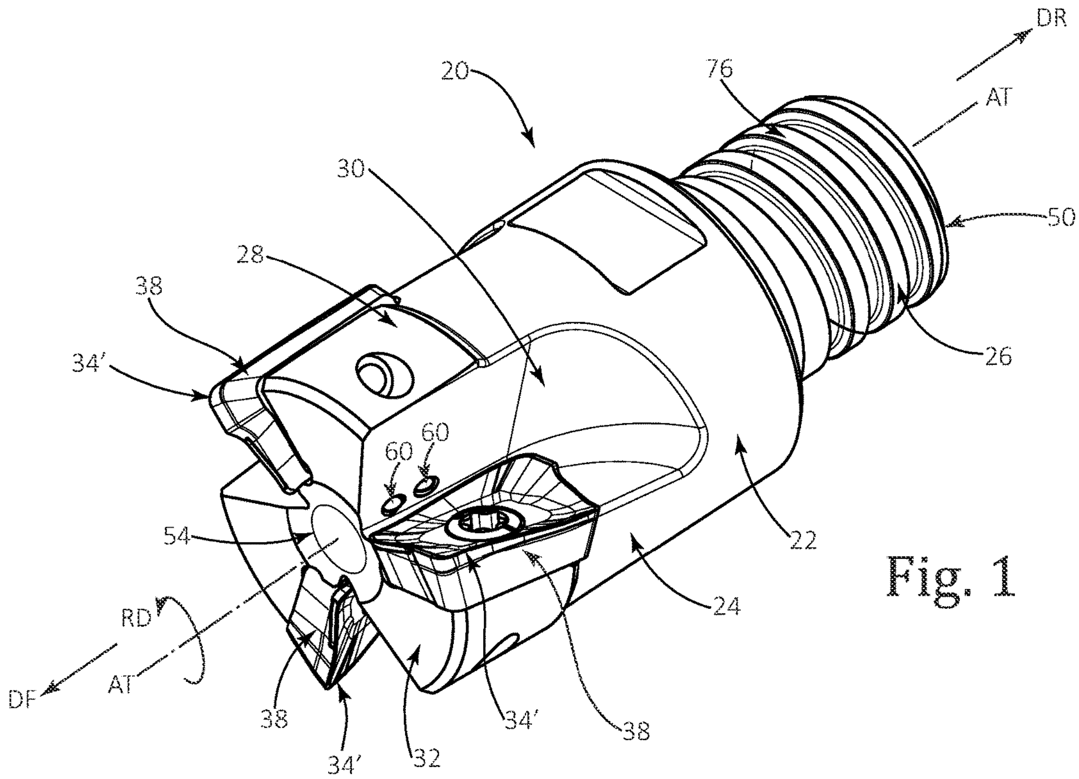
FIG. 1 is a first perspective view of a rotary cutting tool in accordance with some embodiments of the present invention.

Attention is first drawn to FIGS. 1 to 4, showing a rotary cutting tool 20 according to the present invention.

The rotary cutting tool 20 is rotatable about a tool axis AT in a direction of rotation RD, the tool axis AT defining a forward-to-rearward direction DF, DR, and comprises a tool body 22 having a front cutting portion 24 and a rear coupling portion 26, the rear coupling portion 26 located axially rearward of the front cutting portion 24.

As shown in FIGS. 1 to 4, the front cutting portion 24 has a front outer peripheral surface 28 with a plurality of N circumferentially spaced apart cut-outs 30, where N is a specific integer number greater than one, i.e., N>1.

In some embodiments of the present invention, the front outer peripheral surface 28 may be cylindrical.

Also, in some embodiments of the present invention, N may preferably be eight or less than eight, i.e., 1<N≤8.

Each cut-out 30 opens out at a front end 32 of the front cutting portion 24 and has an operative cutting edge 34' associated therewith.

In some embodiments of the present invention, as shown in FIGS. 1 to 4, each cut-out 30 may have an insert receiving pocket 36 with a cutting insert 38 removably secured therein, and the operative cutting edge 34' may be formed on the cutting insert 38.

In other embodiments of the present invention (not shown), the N operative cutting edges 34' may be integrally formed on the tool body 22 such that the cutting tool 20 has a unitary one-piece (i.e., “monolithic”) construction.

As shown in FIGS. 1 to 4, each cutting insert 38 may be indexable and have a plurality cutting edges 34, and each cutting insert 38 may be arranged in its associated insert receiving pocket 36 such that only one of the cutting insert’s plurality of cutting edges 34 may be the operative cutting edge 34', i.e., positioned to engage a workpiece (not shown).

In some embodiments of the present invention, the cutting insert 38 may include a through bore 40, and the cutting insert 38 be removably secured to the tool body 22 by means of a clamping screw 42 occupying the through bore 40 and threadingly engaging a screw bore 44 in a seat surface 46 of the insert receiving pocket 36.

Also, in some embodiments of the present invention, the cutting insert 38 may be manufactured from a suitably hard material, for example, cemented carbide, and the tool body 22 may be manufactured from a less hard material, for example, tool steel.

Further, in some embodiments of the present invention, as shown in FIGS. 1 to 4, the cutting insert 38 may be a ‘radial’ type cutting insert.

In other embodiments of the present invention (not shown), the cutting insert 38 may be a ‘tangential’ type cutting insert.

Figure 3:
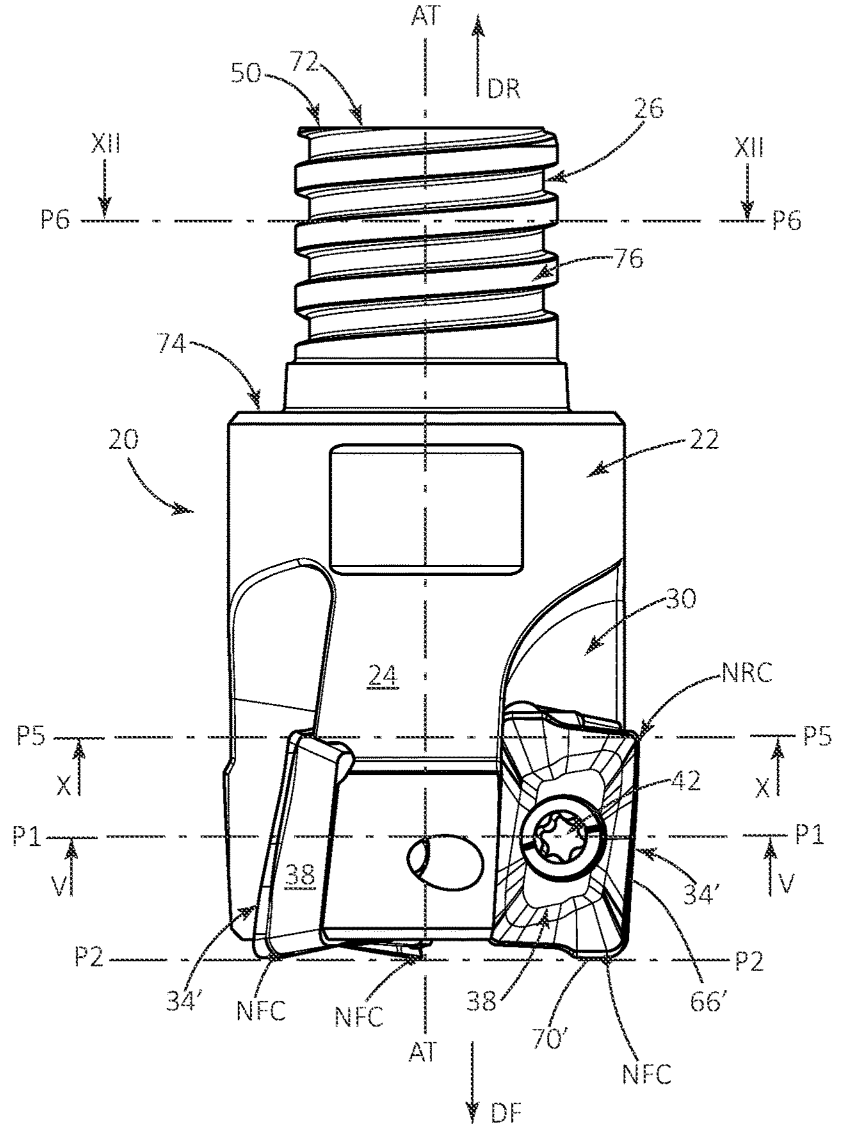
FIG. 3 is a side view of the cutting tool shown in FIG. 1.
Figure 5:
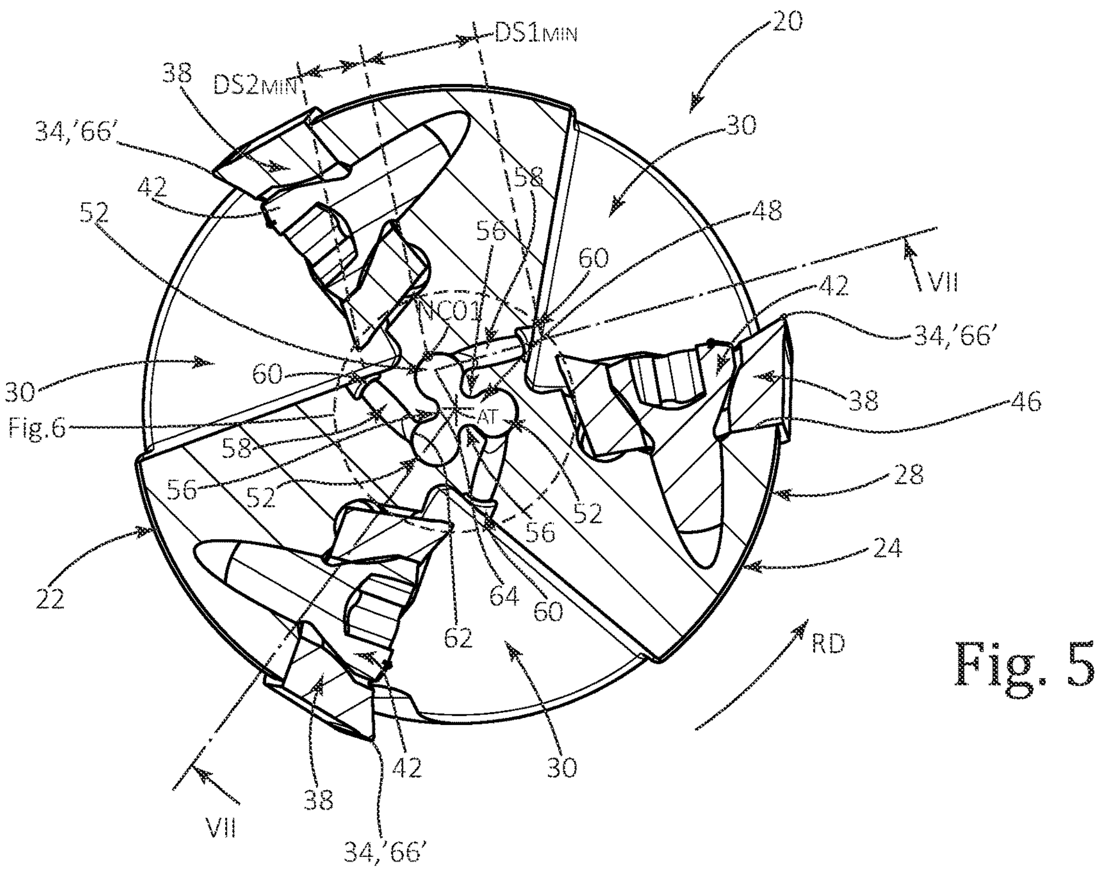
FIG. 5 is a cross-sectional view of the cutting tool shown in FIG. 3, taken along the line V-V.
Figure 7:
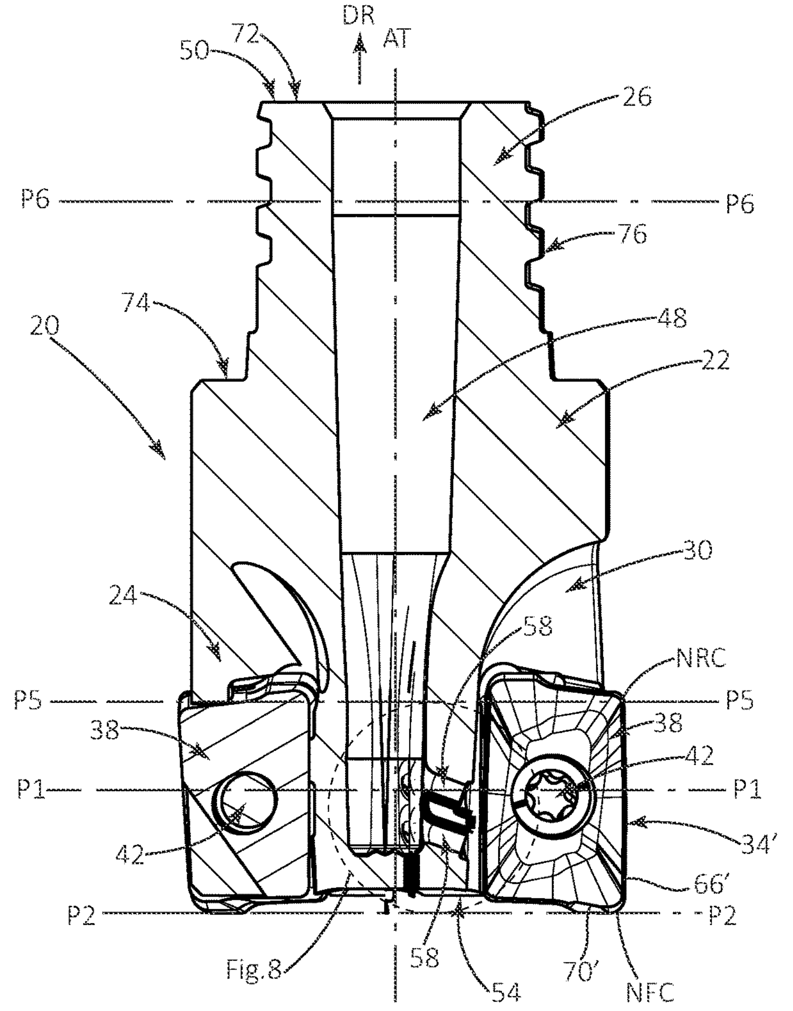
FIG. 7 is a cross-sectional view of the cutting tool shown in FIG. 5, taken along the line VII-VII.

As shown in FIGS. 5 and 7, a single central coolant passage 48 extends along the tool axis AT from a rear end 50 of the rear coupling portion 26 to the front cutting portion 24, and as shown in FIGS. 3 and 7, a first plane P1 perpendicular to the tool axis AT intersects the central coolant passage 48 and the N operative cutting edges 34'. In embodiments in which each cut-out 30 has an insert receiving pocket 36, the first plane P1 may intersect each of the insert receiving pockets 36 and each of the associated seat surfaces 46.

Figure 6:
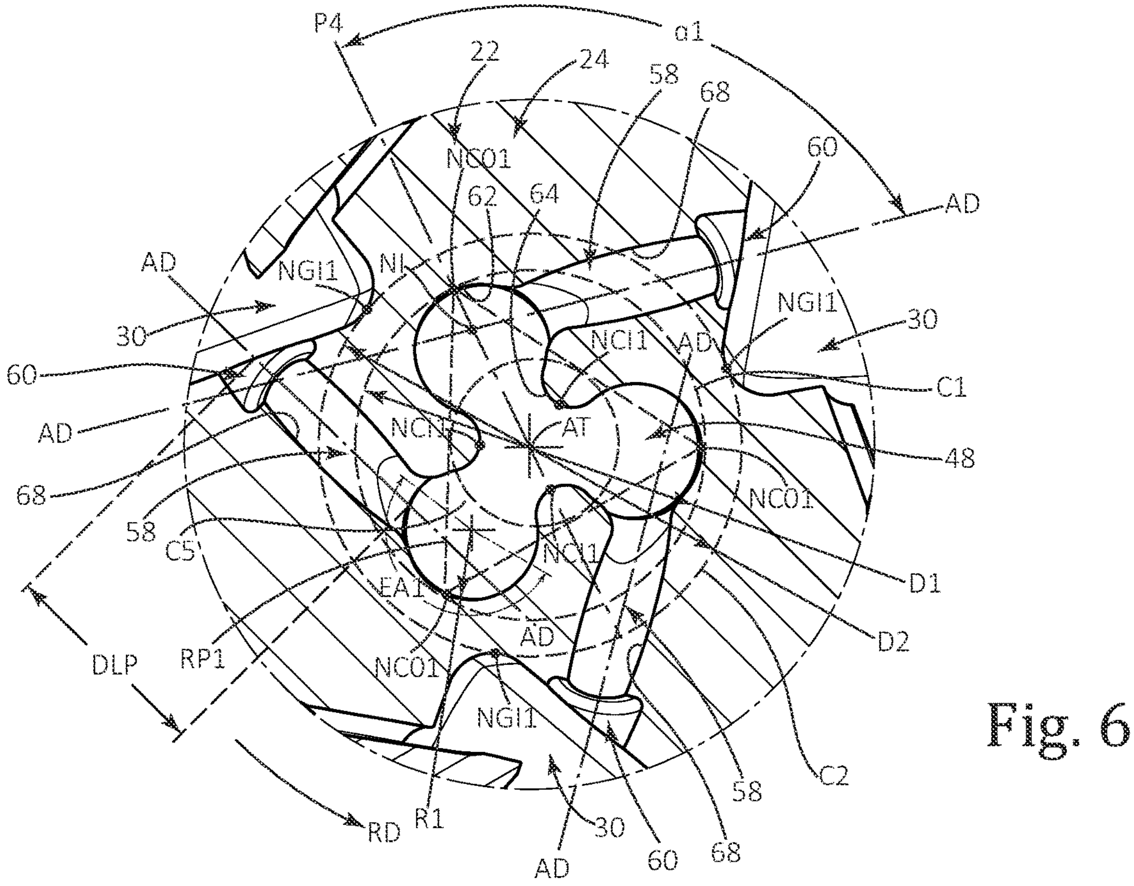
FIG. 6 is a detailed view of the cutting tool shown in FIG. 5.

As shown in FIGS. 5 and 6, in a cross-section taken in the first plane P1, the central coolant passage 48 has a non-circular shape with N radially outer coolant regions 52, each radially outer coolant region 52 having a first radially outermost coolant point NCO1, and the central coolant passage 48 is circumscribed by an imaginary first circle C1 having a first diameter D1 and a center coincident with the tool axis AT.

In some embodiments of the present invention, as shown in FIGS. 5 and 6, in the cross-section taken in the first plane P1, each first radially outermost coolant point NCO1 may lie on the imaginary first circle C1.

Also, in some embodiments of the present invention, as shown in FIGS. 5 and 6, in the cross-section taken in the first plane P1, each first radially outermost coolant point NCO1 may define one of N apex points of an N-sided first regular polygon RP1.

For embodiments of the present invention in which the N radially outer coolant regions 52 of the central coolant passage 48 define an N-sided first regular polygon RP1, in the cross-section taken in the first plane P1, it should be appreciated that N is a specific integer number greater than two, i.e., N>2.

FIGS. 1 to 6 show an embodiment of the present invention in which N is equal to three, i.e., N=3, and the N-sided first regular polygon RP1 is an equilateral triangle.

Figure 4:
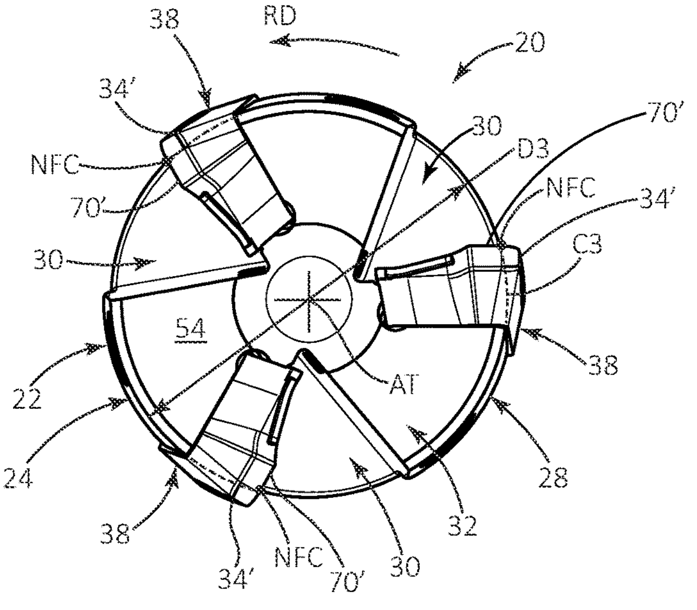
FIG. 4 is an end view of the cutting tool shown in FIG. 1.

As shown in FIGS. 1 and 4, the front cutting portion’s front end 32 may have a forward-facing first end surface 54.

In some embodiments of the present invention, the central coolant passage 48 may terminate axially rearward of the first end surface 54. For such embodiments of the present invention, it should be appreciated that the tool axis AT may intersect the first end surface 54.

As shown in FIGS. 5 and 6, in the cross-section taken in the first plane P1, the central coolant passage 48 may include N radially recessed coolant regions 56 circumferentially alternating with the N radially outer coolant regions 52.

In some embodiments of the present invention, each radially recessed coolant region 56 may have a first radially innermost coolant point NCI1 located inside the first regular polygon RP1.

For such embodiments of the present invention, it should be appreciated that the N radially recessed coolant regions 56 contribute to preserving the core strength of the tool body 22.

According to the present invention, as shown in FIGS. 5 to 8, at least one coolant duct 58 extends transversely from each radially outer coolant region 52 to intersect with and open out at one of the N cut-outs 30 at one or more coolant exit ports 60.

By configuring each coolant duct 58 to extend from one of the radially outer coolant regions 52 of the non-circular central coolant passage 48 to one of the N cut-outs 30, as shown in FIGS. 5 and 7, it should be appreciated that greater flexibility of design is afforded with respect to the direction and extent of each coolant duct 58.

Figure 8:
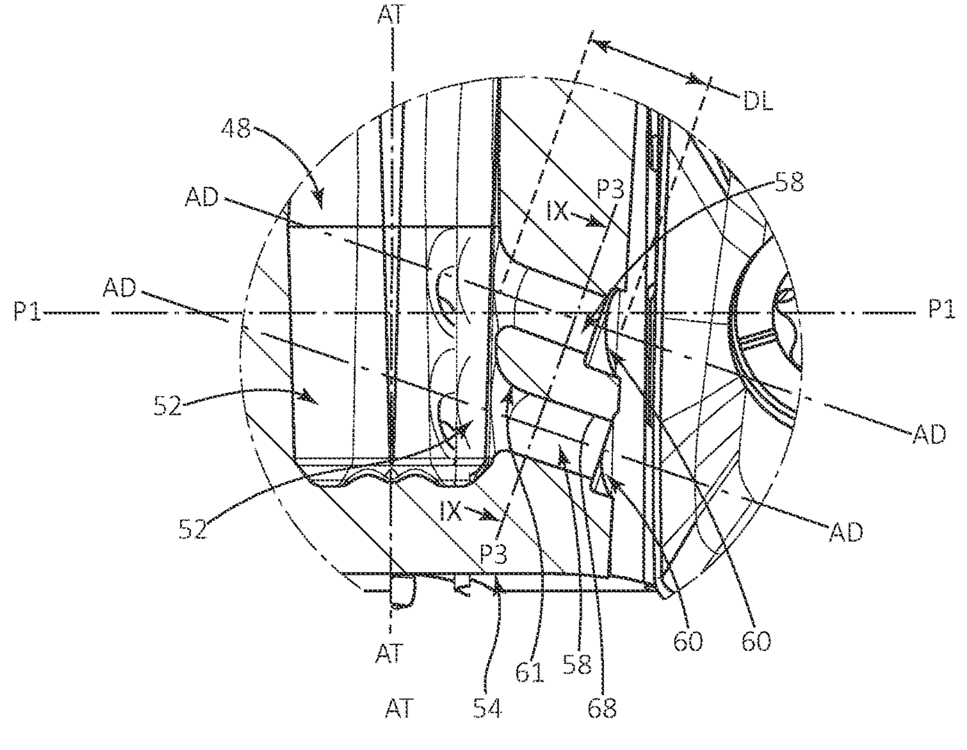
FIG. 8 is a detailed view of the cutting tool shown in FIG. 7.

In some embodiments of the present invention, as shown in FIGS. 7 and 8, each coolant duct 58 may merge with the associated radially outer coolant region 52 via convexly curved joining surfaces 61, such that smooth and undisturbed flow of coolant fluid from the central coolant passage 48 to each coolant duct 58 is promoted. For such embodiments of the present invention, it should be appreciated that the cutting tool body 22 may be produced by means of additive manufacturing, resulting in an additively manufactured tool body. One skilled in the art can determine whether a given tool body has been made by an additive manufacturing process by inspecting the microscopic structure of the material constituting the tool body.

Also, in some embodiments of the present invention, each cut-out 30 may intersect the first end surface 54, and each coolant exit port 60 may be located axially rearward of the first end surface 54.

Further, in some embodiments of the present invention, as shown in FIGS. 5 and 7, each coolant duct 58 may direct coolant fluid towards the operative cutting edge 34' of the associated cut-out 30.

It should be appreciated that directing coolant fluid towards the operative cutting edge 34' significantly reduces wear and extends the useful life thereof.

As shown in FIGS. 5 and 6, in the cross-section taken in the first plane P1, each first radially outermost coolant point NCO1 may be located on a concavely curved first inner wall 62 of the associated radially outer coolant region 52, and the first inner wall 62 may have a first radius R1.

In some embodiments of the present invention, as shown in FIG. 6, each coolant duct 58 may extend away from the first inner wall 62 of the associated radially outer coolant region 52.

For embodiments of the present invention in which N is equal to two, i.e., N=2 (not shown), and the central coolant passage 48 has two radially outer coolant regions 52 with two concavely curved first inner walls 62, it should be appreciated that in a cross-section of the central coolant passage 48 taken perpendicular to the tool axis AT, the central coolant passage 48 may have a figure '8' shape.

In some embodiments of the present invention, the first radius R1 may be greater than ten percent of the first diameter D1, i.e., R1>0.10*D1.

Also, in some embodiments of the present invention, each first inner wall 62 may have a first angular extent EA1 of greater than ninety degrees, i.e., EA1>90°. In some embodiments, the first angular extent EA1 may even be greater than 180°.

For embodiments of the present invention in which the concavely curved first inner wall 62 has a relatively large first radius R1, i.e., R1>0.10*D1, and/or a relatively large first angular extent EA1, i.e., EA1>90°, it should be appreciated that smooth and undisturbed flow of coolant fluid from the central coolant passage 48 to each coolant duct 58 is promoted.

As shown in FIG. 6, in the cross-section taken in the first plane P1, each first radially innermost coolant point NCI1 may be located on a convexly curved second inner wall 64 of the associated radially recessed coolant region 56.

In some embodiments of the present invention, each convexly curved second inner wall 64 may tangentially merge with a circumferentially adjacent concavely curved first inner wall 62.

For embodiments of the present invention in which the convexly curved second inner wall 64 tangentially merges with a circumferentially adjacent concavely curved first inner wall 62, it should be appreciated that smooth and undisturbed flow of coolant fluid from the central coolant passage 48 to each coolant duct 58 is promoted. For such embodiments of the present invention, it should be appreciated that the cutting tool body 22 may be produced by means of additive manufacturing.

As shown in FIG. 6, in the cross-section taken in the first plane P1, the plurality of N cut-outs 30 may be inscribed by an imaginary second circle C2 at N first radially innermost cut-out points NGI1.

In some embodiments of the present invention, at least N coolant ducts 58 may traverse the imaginary second circle C2, or an axial projection thereof.

Also, in some embodiments of the present invention, each of the at least N coolant ducts 58 may traverse the imaginary second circle C2, or an axial projection thereof, rotationally ahead of the associated first radially innermost cut-out point NGI1. For such embodiments of the present invention, it should be appreciated that the associated first radially innermost cut-out point NGI1 of each of the at least N coolant ducts 58 is the first radially innermost cut-out point NGI1 of the cut-out 30 to which the coolant duct 58 extends and intersects.

As shown in FIG. 6, the imaginary second circle C2 has a second diameter D2 and a center coincident with the tool axis AT.

In some embodiments of the present invention, the first diameter D1 may be greater than fifty percent of the second diameter D2, i.e., D1>0.50*D2.

For embodiments of the present invention in which the first diameter D1 is relatively large, i.e., D1>0.50*D2, it should be appreciated that configuring the central coolant passage 48 to have the N radially recessed coolant regions 56 may have even greater significance in preserving the core strength of the tool body 22.

As shown in FIGS. 1 to 4, each operative cutting edge 34' has an axially forwardmost cutting point NFC and an operative primary cutting edge portion 66' extending radially outwardly and axially rearwardly from the axially forwardmost cutting point NFC.

In some embodiments of the present invention, the first plane P1 may intersect the N operative primary cutting edge portions 66'.

As shown in FIGS. 3 and 4, each operative cutting edge 34' may have an operative secondary cutting edge portion 70' extending radially inwardly from the associated axially forwardmost point NFC.

In some embodiments of the present invention, each operative secondary cutting edge portion 70' may be described as a wiper edge.

As shown in FIG. 4, the N axially forwardmost points NFC may define an imaginary third circle C3 having a third diameter D3 and a center coincident with the tool axis AT.

In some embodiments of the present invention, the third diameter D3 may be greater than the second diameter D2, i.e., D3>D2.

As shown in FIG. 3, the N axially forwardmost points NFC may be contained in a second plane P2 perpendicular to the tool axis AT, and no portion of the cutting tool 20 may be located axially forward of the second plane P2.

In some embodiments of the present invention, the cutting tool 20 may be used in milling operations, during which the operative primary cutting edge portion 66' of each operative cutting edge 34' may be subjected to a major portion of the cutting forces associated therewith, and the operative secondary cutting edge portion 70' may be subjected to a minor portion of the cutting forces associated therewith.

Also, in some embodiments of the present invention, each coolant duct 58 may direct coolant fluid towards the operative primary cutting edge portion 66' of the associated operative cutting edge 34'.

It should be appreciated that directing coolant fluid towards the operative primary cutting edge portion 66' of the associated operative cutting edge 34' significantly reduces wear and extends the useful life thereof.

As shown in FIGS. 5 to 8, each coolant duct 58 may have a circumferentially closed inner duct surface 68, and each coolant duct 58 may extend along a duct axis AD from the central coolant passage 48 to the associated coolant exit port 60.

In some embodiments of the present invention, each duct axis AD may be rectilinear, and each coolant duct 58 may extend from the central coolant passage 48 to the associated coolant exit port 60 without its duct axis AD intersecting the associated inner duct surface 68.

For such embodiments of the present invention, as shown in FIGS. 5 to 8, each coolant duct 58 may linearly extend along its duct axis AD from the central coolant passage 48 to the associated coolant exit port 60.

For other embodiments of the present invention (not shown), each coolant duct 58 may have a certain degree of longitudinal curvature, although each coolant duct 58 may still extend from the central coolant passage 48 to the associated coolant exit port 60 without its rectilinear duct axis AD intersecting the associated inner duct surface 68.

For embodiments of the present invention in which each coolant duct 58 linearly extends along its duct axis AD, it should be appreciated that uniform and axisymmetric flow of coolant fluid along each coolant duct 58 is promoted.

Also, for embodiments of the present invention in which each coolant duct 58 is advantageously constrained to linearly extend along its associated duct axis AD, it should be appreciated that configuring each coolant duct 58 to extend from one of the radially outer coolant regions 52 of the non-circular central coolant passage 48 to one of the N cut-outs 30 has even greater significance in affording flexibility of design with respect to the direction and extent of each coolant duct 58.

As shown in FIG. 8, each coolant duct 58 has a duct length DL measured along its rectilinear duct axis AD.

In some embodiments of the present invention, the duct length DL may be more than forty percent of the second diameter D2, i.e., DL>0.40*D2.

Also, in some embodiments of the present invention, as shown in FIG. 8, each coolant duct 58 may extend in the forward direction DF as it extends away from the central coolant passage 48 to one of the N cut-outs 30.

As shown in FIG. 6, in the cross-section taken in the first plane P1, each coolant duct 58 has an axially projected duct length DLP.

For embodiments of the present invention in which each coolant duct 58 extends in the forward direction DF as it extends away from the central coolant passage 48 to one of the N cut-outs 30, it should be appreciated that the axially projected duct length DLP is less than the duct length DL, i.e., DLP<DL.

In some embodiments of the present invention, the axially projected duct length DLP may be greater than half the difference between the first diameter D1 and the second diameter D2, i.e., DLP>0.5*(D2−D1).

Configuring the central coolant passage 48 to be non-circular and have N radially outer coolant regions 52 advantageously enables each coolant duct 58 to have a sufficiently long axially projected duct length DLP and duct length DL, such that it may linearly extend along its duct axis AD and direct a uniform and axisymmetric flow of coolant fluid towards the operative cutting edge 34'.

In some embodiments of the present invention, each coolant duct 58 may have a non-circular cross-section shape.

Also, in some embodiments of the present invention, each coolant duct 58 may have a cross-sectional area which varies along its length from the central coolant passage 48 to the associated coolant exit port 60.

Figure 9:
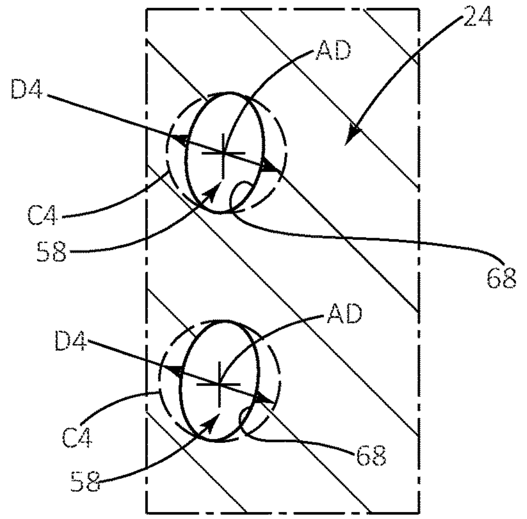
FIG. 9 is a cross-sectional view of the cutting tool shown in FIG. 8, taken along the line IX-IX.

As shown in FIG. 9, in a cross-section taken in a third plane P3 perpendicular to one of the duct axes AD and intersecting the associated coolant duct 58, the coolant duct 58 may have an elliptical shape.

Also, as shown in FIG. 9, in the cross-section taken in the third plane P3, an imaginary fourth circle C4 having a fourth diameter D4 and a center coincident with the duct axis AD circumscribes the associated coolant duct 58.

In some embodiments of the present invention, the fourth diameter D4 may be less than thirty percent of the first diameter D1, i.e., D4<0.30*D1.

As shown in FIG. 6, in the cross-section taken in the first plane P1, a fourth plane P4 contains the tool axis AT and the first radially outermost coolant point NCO1 of one of the radially outer coolant regions 52. The duct axis AD associated with said radially outer coolant region 52, forms a first angle $\alpha$1 with the fourth plane P4.

In some embodiments of the present invention, the first angle $\alpha$1 may be greater than sixty degrees and less than one hundred and twenty degrees, i.e., 60°<$\alpha$1<120°.

As shown in FIG. 6, in the cross-section taken in the first plane P1, each duct axis AD, intersects the fourth plane P4 of the associated radially outer coolant region 52 at an intersection point NI.

In some embodiments of the present invention, the intersection point NI may be located closer to the associated first radially outermost coolant point NCO1 than the tool axis AT.

As shown in FIG. 6, in the cross-section taken in the first plane P1, an imaginary fifth circle C5 inscribes the first regular polygon RP1.

In some embodiments of the present invention, an axial projection of each duct axis AD may traverse the first regular polygon RP1 outside the imaginary fifth circle C5.

As shown in FIG. 5, in the cross-section taken in the first plane P1, the first radially outermost coolant point NCO1 of each radially outer coolant region 52 is located a minimum first distance $DS1_{MIN}$ from the coolant exit port 60 of one of the associated coolant ducts 58, and the first radially outermost coolant point NCO1 of each radially outer coolant region 52 is located a minimum second distance $DS2_{MIN}$ from the coolant exit port 60 of one of the non-associated coolant ducts 58.

In some embodiments of the present invention, the minimum first distance $DS1_{MIN}$ may be greater than the minimum second distance $DS2_{MIN}$, i.e., $DS1_{MIN}>DS2_{MIN}$.

Also, in some embodiments of the present invention, the coolant exit port 60 of said non-associated coolant duct 58 may be rotationally adjacent and ahead of the coolant exit port 60 of said associated coolant duct 58.

As shown in FIGS. 5 and 6, the first plane P1 may intersect at least N coolant ducts 58.

In some embodiments of the present invention, the first plane P1 may intersect exactly N coolant ducts 58 along the entire lengths thereof. For such embodiments of the present invention, as shown in FIGS. 5 and 6, in the cross-section taken in the first plane P1, communication between the central coolant passage 48 and the plurality of N cut-outs 30 via the said exactly N coolant ducts 58 is clearly visible.

As shown in FIGS. 5 and 6, in the cross-section taken in the first plane P1, the tool body 22 may exhibit N-fold rotational symmetry about the tool axis AT.

As shown in FIGS. 7 and 8, two coolant ducts 58 may extend transversely from each radially outer coolant region 52 to intersect with and open out at the same cut-out 30.

In some embodiments of the present invention, the two duct axes AD associated with the said two coolant ducts 58 may be parallel.

As shown in FIG. 3, each operative major cutting edge 34' has an axially rearwardmost cutting point NRC, and a fifth plane P5 perpendicular to the tool axis AT and intersecting the central coolant passage 48 axially rearward of the first plane P1 may contain the plurality of N axially rearwardmost cutting points NRC.

In some embodiments of the present invention, each operative primary cutting edge portion 66' may extend between the axially forwardmost cutting point NFC and the axially rearwardmost cutting point NRC of the associated operative major cutting edge 34'.

Figure 10:
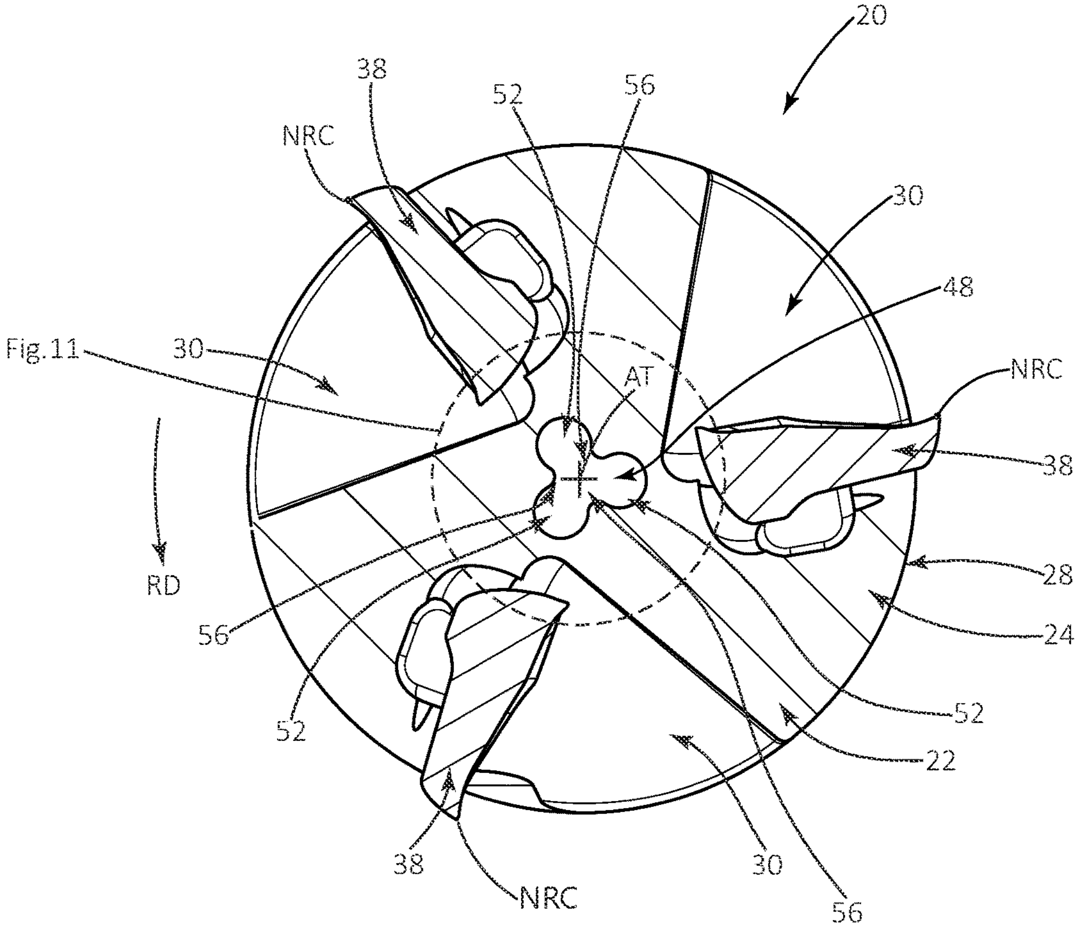
FIG. 10 is a cross-sectional view of the cutting tool shown in FIG. 3, taken along the line X-X.
Figure 11:
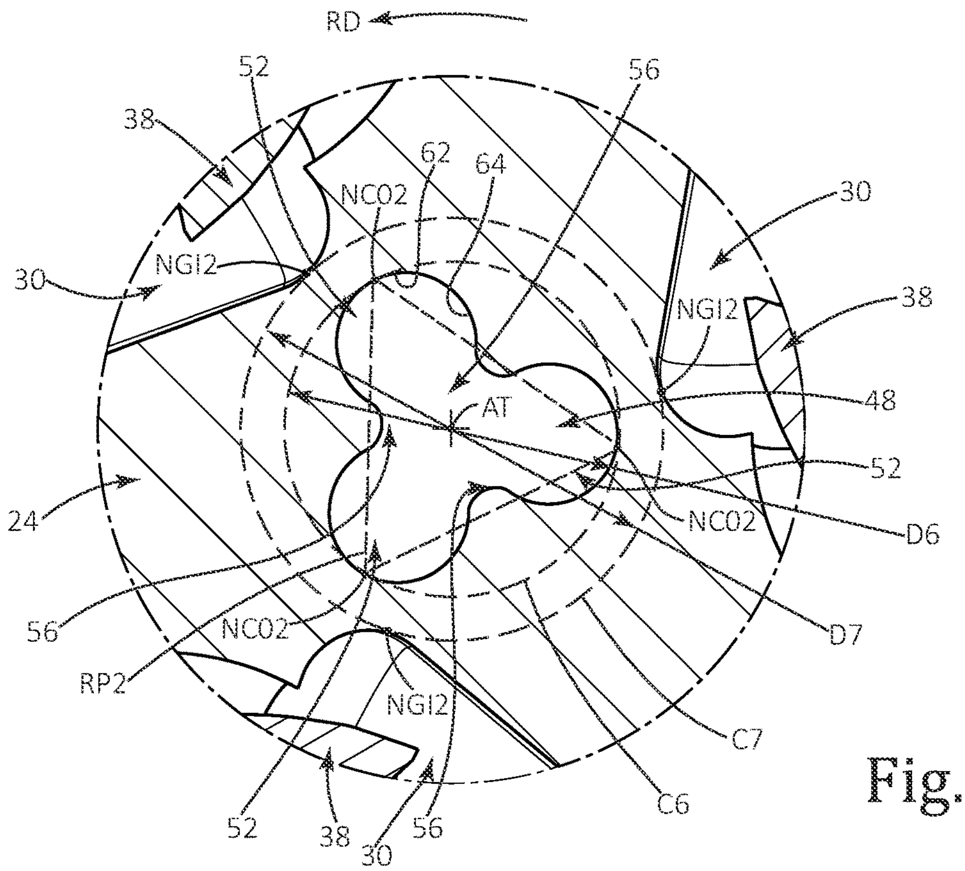
FIG. 11 is a detailed view of the cutting tool shown in FIG. 10.

As shown in FIGS. 10 and 11, in a cross-section taken in the fifth plane P5, the central coolant passage 48 may have a non-circular shape defined by the N radially outer coolant regions 52, which are circumscribed by an imaginary sixth circle C6 having a sixth diameter D6 and a center coincident with the tool axis AT.

Also, as shown in FIGS. 10 and 11, in the cross-section taken in the fifth plane P5, each radially outer coolant region 52 has a second radially outermost coolant point NCO2, and each second radially outermost coolant point NCO2 lies on the imaginary sixth circle C6.

In some embodiments of the present invention, as shown in FIGS. 10 and 11, in the cross-section taken in the fifth plane P5, each second radially outermost coolant point NCO2 may define one of N apex points of an N-sided second regular polygon RP2.

For embodiments of the present invention in which the N radially outer coolant regions 52 of the central coolant passage 48 define an N-sided second regular polygon RP2, in the cross-section taken in the fifth plane P5, it should be appreciated that N is a specific integer number greater than two, i.e., N>2.

In some embodiments of the present invention, the N-sided second regular polygon RP2 may be rotationally coincident with the N-sided first regular polygon RP1. In this context, two axially spaced apart triangles are said to be "rotationally coincident", if they share the same center and same angular orientation, when projected onto a common plane. Thus, the central coolant passage 48 does not "twist" as it extends in the axial direction between the fifth plane P5 and the first plane P1. In other embodiments (not shown), the central coolant passage 48 may experience such a "twist", in which case the N-sided second regular polygon RP2 may be rotationally offset with the N-sided first regular polygon RP1.

Also, in some embodiments of the present invention, in any cross-section taken in a plane perpendicular to the tool axis AT and located between the first and fifth planes P1, P5, the radially outermost coolant points of the central coolant passage 48 may define an N-sided regular polygon rotationally coincident with the first and second regular polygons RP1, RP2.

It should be appreciated that the abovementioned term "any cross-section" may also be interpreted as "every cross-section".

In some embodiments of the present invention, the sixth diameter D6 may be equal to or greater than the first diameter D1 and less than one hundred and twenty percent of the first diameter D1, i.e., $D1 \leq D6 < D1*1.20$.

As shown in FIG. 11, in a cross-section taken in the fifth plane P5, the plurality of N cut-outs 30 may be inscribed by an imaginary seventh circle C7 at N second radially innermost cut-out points NGI2, and the imaginary seventh circle C7 may have a seventh diameter D7 and a center coincident with the tool axis AT.

In some embodiments of the present invention, the seventh diameter D7 may be greater than ninety percent and less than one hundred and ten percent of the second diameter D2, i.e., $D2*0.90 < D7 < D2*1.10$.

Also, in some embodiments of the present invention, the rear coupling portion's rear end 50 may have a rearward-facing second end surface 72, and the central coolant passage 48 may intersect and open out at the second end surface 72.

Figure 12:
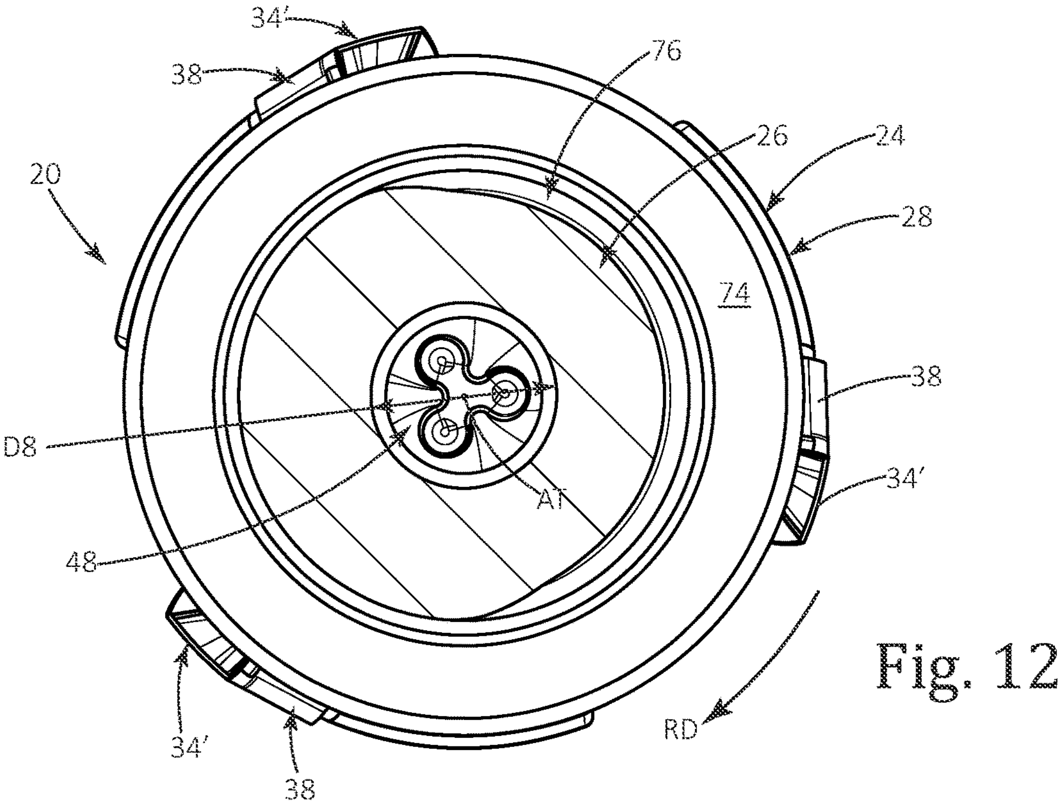
FIG. 12 is a cross-sectional view of the cutting tool shown in FIG. 3, taken along the line XII-XII.

As shown in FIG. 12, in a cross-section taken in a sixth plane P6 perpendicular to the tool axis AT and intersecting the rear coupling portion 26 and the central coolant passage 48, the central coolant passage 48 may have a circular shape with an eighth diameter D8.

In some embodiments of the present invention, the eighth diameter D8 may be greater than the first diameter D1, i.e., D8>D1.

Also, in some embodiments of the present invention, the eighth diameter D8 may be greater than the sixth diameter D6, i.e., D8>D6.

Figure 2:
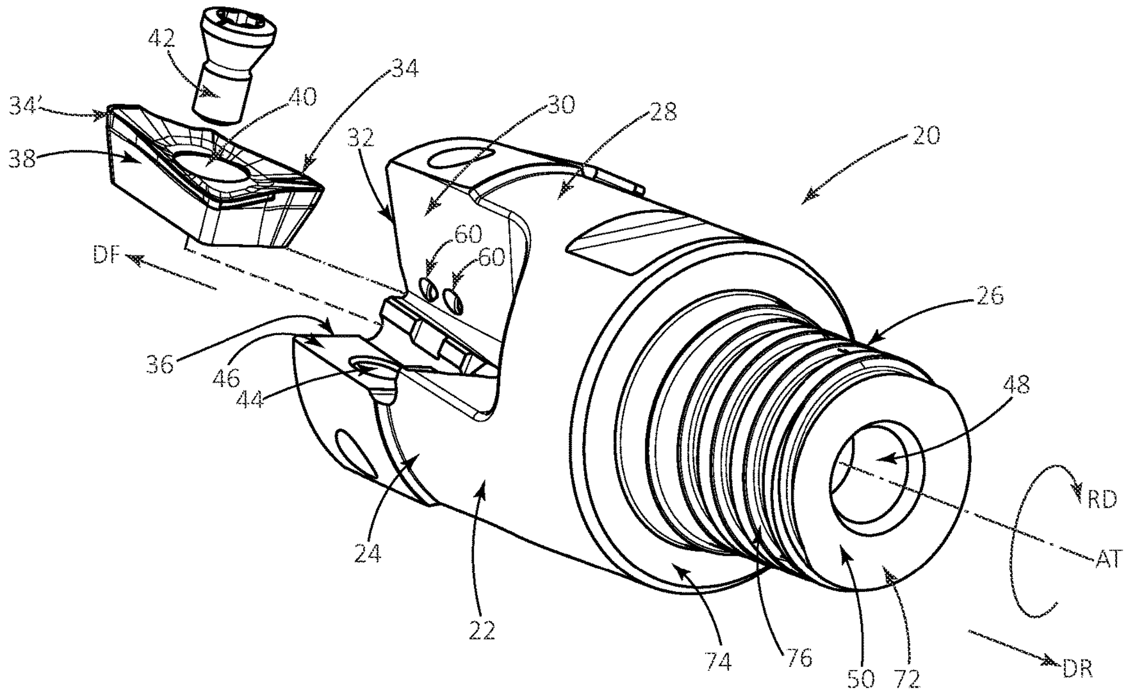
FIG. 2 is an exploded second perspective view of the cutting tool shown in FIG. 1.

As shown in FIG. 2, the rear coupling portion 26 may have an annular shaped shoulder surface 74 facing in the rearward direction DR.

In some embodiments of the present invention, the shoulder surface 74 may intersect the front outer peripheral surface 28.

As shown in FIGS. 1 to 3, the rear coupling portion 26 may have an external threaded portion 76 helically extending along the tool axis AT.

In some embodiments of the present invention, the external threaded portion 76 may be located axially rearward of the shoulder surface 74.

Although the present invention has been described to a certain degree of particularity, it should be understood that various alterations and modifications could be made without departing from the scope of the invention as hereinafter claimed.

What is claimed is:

1. A rotary cutting tool (20) rotatable about a tool axis (AT) in a direction of rotation (RD), the tool axis (AT) defining a forward-to-rearward direction (DF, DR), the cutting tool comprising:

a tool body (22) having a front cutting portion (24) and a rear coupling portion (26), the front cutting portion (24) having a front outer peripheral surface (28) with a plurality of N circumferentially spaced apart cut-outs (30), where N is a specific integer number greater than one, each cut-out (30) opening out at a front end (32) of the front cutting portion (24), each cut-out (30) having an operative cutting edge (34') associated therewith, wherein a central coolant passage (48) extends unobstructed along the tool axis (AT) from a rear end (50) of the rear coupling portion (26) to the front cutting portion (24), and a first plane (P1) perpendicular to the tool axis (AT) intersects the central coolant passage (48) and the operative cutting edges (34'), wherein, in a cross-section taken in the first plane (P1), the central coolant passage (48) has a non-circular shape with N radially outer coolant regions (52), each radially outer coolant region (52) having a first radially outermost coolant point (NCO1), and the central coolant passage (48) is circumscribed by an imaginary first circle (C1) having a first diameter (D1) and a center coincident with the tool axis (AT), and wherein:

at least one coolant duct (58) extends transversely from each radially outer coolant region (52) to intersect with and open out at one of the N cut-outs (30) at a coolant exit port (60).

2. The cutting tool (20) according to claim 1, wherein, in the cross-section taken in the first plane (P1):

each first radially outermost coolant point (NCO1) lies on the imaginary first circle (C1).

3. The cutting tool (20) according to claim 1, wherein:

each coolant duct (58) has a circumferentially closed inner duct surface (68), and each coolant duct (58) extends along a rectilinear duct axis (AD) from the central coolant passage (48) to the coolant exit port (60) associated with the respective coolant duct (58) without the duct axis (AD) intersecting the inner duct surface (68) associated with the respective coolant duct (58).

4. The cutting tool (20) according to claim 3, wherein, in the cross-section taken in the first plane (P1):

a fourth plane (P4) contains the tool axis (AT) and the first radially outermost coolant point (NCO1) of one of the radially outer coolant regions (52), the duct axis (AD) of the coolant duct (58) that extends from the radially outer coolant region (52), forms a first angle ($\alpha$1) with the fourth plane (P4), and the first angle ($\alpha$1) is greater than sixty degrees and less than one hundred and twenty degrees.

5. The cutting tool (20) according to claim 4, wherein, in the cross-section taken in the first plane (P1):

each duct axis (AD), intersects the fourth plane (P4) of the radially outer coolant region (52) from which the coolant duct (58) extends at an intersection point (NI), and the intersection point (NI) is located closer to the first radially outermost coolant point (NCO1) of the respective outer coolant region (52) than the tool axis (AT).

6. The cutting tool (20) according to claim 1, wherein, in the cross-section taken in the first plane (P1):

each first radially outermost coolant point (NCO1) defines one of N apex points of an N-sided first regular polygon (RP1).

7. The cutting tool (20) according to claim 6, wherein, in the cross-section taken in the first plane (P1):

the central coolant passage (48) includes N radially recessed coolant regions (56) circumferentially alternating with the N radially outer coolant regions (52), and each radially recessed coolant region (56) has a first radially innermost coolant point (NCI1) located inside the first regular polygon (RP1).

8. The cutting tool (20) according to claim 7, wherein:

each first radially innermost coolant point (NCI1) is located on a convexly curved second inner wall (64) of one of the radially recessed coolant regions (56).

9. The cutting tool (20) according to claim 6, wherein:

each operative major cutting edge (34') has an axially rearwardmost cutting point (NRC), a fifth plane (P5) perpendicular to the tool axis (AT) intersects the central coolant passage (48) axially rearward of the first plane (P1) and contains the plurality of N axially rearwardmost cutting points (NRC), and in a cross-section taken in the fifth plane (P5):

the central coolant passage (48) has a non-circular shape defined by the N radially outer coolant regions (52), each radially outer coolant region (52) has a second radially outermost coolant point (NCO2), and each second radially outermost coolant point (NCO2) defines one of N apex points of an N-sided second regular polygon (RP2).

10. The cutting tool (20) according to claim 9, wherein:

the N-sided second regular polygon (RP2) is rotationally coincident with the N-sided first regular polygon (RP1).

11. The cutting tool (20) according to claim 10, wherein, in any cross-section taken in a plane perpendicular to the tool axis (AT) and located between the first and fifth planes (P1, P5):

the radially outermost points of the central coolant passage (48) define an N-sided regular polygon rotationally coincident with the first and second regular polygons (RP1, RP2).

12. The cutting tool (20) according to claim 1, wherein:

the front cutting portion's front end (32) has a forward-facing first end surface (54), and the central coolant passage (48) terminates axially rearward of the forward-facing first end surface (54).

13. The cutting tool (20) according to claim 12, wherein:

each cut-out (30) intersects the first end surface (54), and each coolant exit port (60) is located axially rearward of the first end surface (54).

14. The cutting tool (20) according to claim 1, wherein:

the first plane (P1) intersects at least N coolant ducts (58).

15. The cutting tool (20) according to claim 14, wherein, in the cross-section taken in the first plane (P1):

the tool body (22) exhibits N-fold rotational symmetry about the tool axis (AT).

16. The cutting tool (20) according to claim 1, wherein, in the cross-section taken in the first plane (P1):

the plurality of N cut-outs (30) are inscribed by an imaginary second circle (C2) at N first radially innermost cut-out points (NGI1), and at least N coolant ducts (58) traverse the imaginary second circle (C2), or an axial projection of the imaginary second circle (C2).

17. The cutting tool (20) according to claim 16, wherein:

the imaginary second circle (C2) has a second diameter (D2) and a center coincident with the tool axis (AT), and the first diameter (D1) is greater than fifty percent of the second diameter (D2).

18. The cutting tool (20) according to claim 1, wherein, in the cross-section taken in the first plane (P1):

each first radially outermost coolant point (NCO1) is located on a concavely curved first inner wall (62) of the respective radially outer coolant region (52) having a first radius (R1), and the first radius (R1) is greater than ten percent of the first diameter (D1).

19. The cutting tool (20) according to claim 18, wherein, in the cross-section taken in the first plane (P1):

each first inner wall (62) has a first angular extent (EA1) of greater than ninety degrees about a central axis thereof.

20. The cutting tool (20) according to claim 1, wherein:

each operative cutting edge (34') has an axially forwardmost cutting point (NFC) and an operative primary cutting edge portion (66') extending radially outwardly and axially rearwardly from the axially forwardmost cutting point (NFC).

21. The cutting tool (20) according to claim 20, wherein:

each coolant duct (58) directs coolant fluid towards the operative primary cutting edge portion (66') of the operative cutting edge (34') associated with the respective cooling duct (58).

22. The cutting tool (20) according to claim 20, wherein:

the axially forwardmost cutting points (NFC) are contained in a second plane (P2) perpendicular to the tool axis (AT), and no portion of the cutting tool (20) is located axially forward of the second plane (P2).

23. The cutting tool (20) according to claim 1, wherein:

each cut-out (30) has an insert receiving pocket (36) with a cutting insert (38) removably secured therein, and the operative cutting edge (34') is formed on the cutting insert (38).

24. The cutting tool (20) according to claim 1, wherein, in the cross-section taken in the first plane (P1):

the first radially outermost coolant point (NCO1) of each radially outer coolant region (52) is located a minimum first distance (DS1MIN) from the coolant exit port (60) of the coolant duct (58) that extends from the respective radially outer coolant region (52) or from an axial projection of the coolant duct (58) that extends from the respective radially outer coolant region (52) measured in the first plane (P1), the first radially outermost coolant point (NCO1) of each radially outer coolant region (52) is located a minimum second distance (DS2MIN) from the coolant exit port (60) of one of the coolant ducts (58) that does not extend from the respective radially outer coolant region (52) associated with the first radially outermost coolant point (NCO1) or from an axial projection of the coolant exit port (60) of one of the coolant ducts (58) that does not extend from the respective radially outer coolant region (52) associated with the first radially outermost coolant point (NCO1) measured in the first plane (P1), and the minimum first distance (DS1MIN) is greater than the minimum second distance (DS2MIN).

25. A rotary cutting tool body (22) rotatable about a tool axis (AT) in a direction of rotation (RD), the tool axis (AT) defining a forward-to-rearward direction (DF, DR), the rotary cutting tool body (22) comprising:

a front cutting portion (24) and a rear coupling portion (26);

the front cutting portion (24) having a front outer peripheral surface (28) with a plurality of N circumferentially spaced apart cut-outs (30), where N is a specific integer number greater than one, each cut-out (30) opening out at a front end (32) of the front cutting portion (24), each cut-out 30 having an insert receiving pocket (36) associated therewith, the insert receiving pocket (36) having a seat surface (46) with a screw bore (44) formed therein, wherein a central coolant passage (48) extends unobstructed along the tool axis (AT) from a rear end (50) of the rear coupling portion (26) to the front cutting portion (24), and a first plane (P1) perpendicular to the tool axis (AT) intersects the central coolant passage (48) and the seat surfaces (46), wherein, in a cross-section taken in the first plane (P1), the central coolant passage (48) has a non-circular shape with an integer number N radially outer coolant regions (52), each radially outer coolant region (52) having a first radially outermost coolant point (NCO1), and the central coolant passage (48) is circumscribed by an imaginary first circle (C1) having a first diameter (D1) and a center coincident with the tool axis (AT), and wherein:

at least one coolant duct (58) extends transversely from each radially outer coolant region (52) to intersect with and open out at one of the N cut-outs (30) at a coolant exit port (60).

* * * * *